United States Patent [19]

Czarnota

[11] 4,211,366
[45] Jul. 8, 1980

[54] VEHICLE TIRE TRACTION STRIP

[76] Inventor: John J. Czarnota, 1614 Scoville Ave., Berwyn, Ill. 60402

[21] Appl. No.: 935,364

[22] Filed: Aug. 21, 1978

[51] Int. Cl.² .......................................... E01B 23/00
[52] U.S. Cl. .................................................. 238/14
[58] Field of Search ............ 238/14; 152/208, 213 R, 152/213 A; 180/7 R; 305/50

[56] References Cited

U.S. PATENT DOCUMENTS

| | | | |
|---|---|---|---|
| 1,410,055 | 3/1922 | Brian | 238/14 |
| 3,350,013 | 10/1967 | Bergquist | 238/14 |
| 3,425,624 | 2/1969 | Jacobs | 238/14 |
| 3,701,474 | 10/1972 | Welz | 238/14 |
| 3,836,075 | 9/1974 | Botbol | 238/14 |
| 3,858,803 | 1/1975 | Gantert | 238/14 |
| 3,861,592 | 1/1975 | Fisher | 238/14 |
| 4,121,765 | 10/1978 | Fosteris | 238/14 |

Primary Examiner—Randolph A. Reese

[57] ABSTRACT

A traction strip for vehicle driving wheels including a sheet of flexible material and a plurality of equally sized metal channels which are mounted in a contiguous spaced relationship on both sides of the sheet. The channels are mounted on the sheet in a back to back position, the free ends of the channels' side walls being directed away from the sheet so as to allow the upper channels to engage the vehicle wheels while the lower channels grip the road surface.

7 Claims, 4 Drawing Figures

U.S. Patent  Jul. 8, 1980  4,211,366
FIG. 1
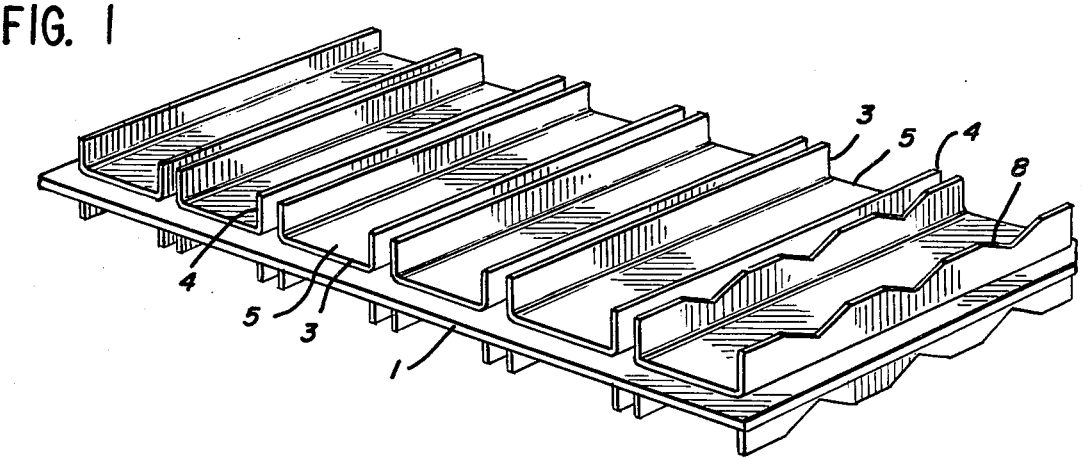
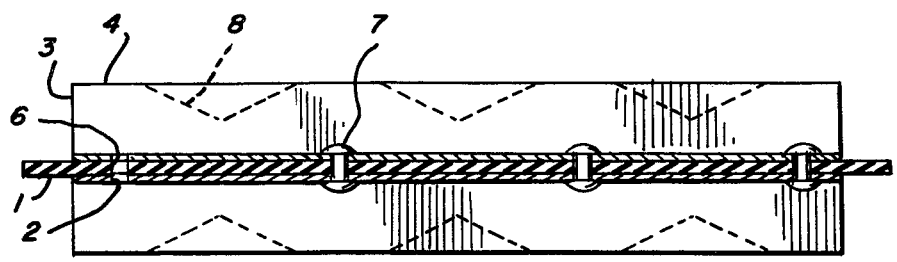
FIG. 3
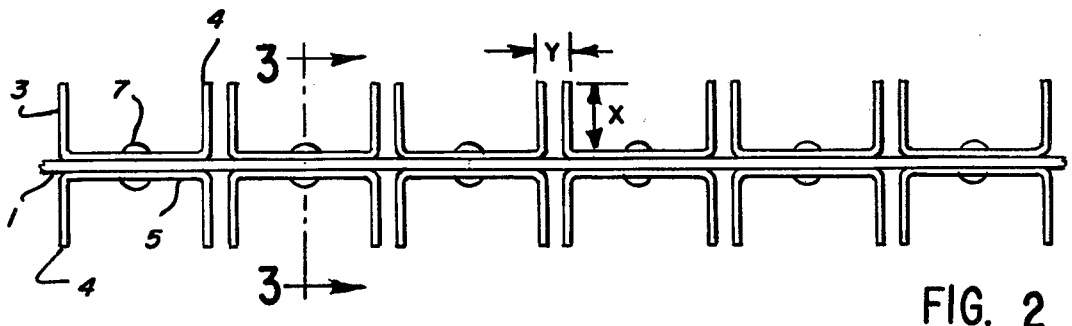
FIG. 2
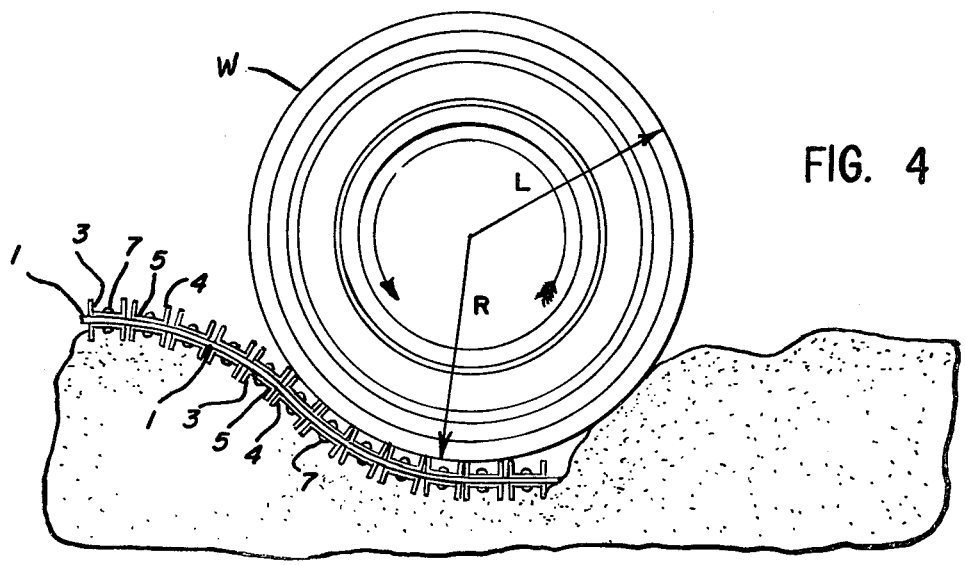
FIG. 4

VEHICLE TIRE TRACTION STRIP

BACKGROUND OF THE INVENTION

1. Field of invention

The invention relates generally to a novel vehicle accessory device providing for improved traction to vehicle wheels, and particularly to an improved traction strip for automotive driving wheels, for enabling a vehicle to move away after standing on a snow covered or icy or muddy road surface.

2. Description of the Prior Art

During winter months vehicular traffic on various roads, highways and railroads is hampered and frequently coming to a halt because of hazardous weather conditions, i.e. slippery snow or icy surface, sliding mud etc. In the case of an automobile traveling on a snow covered highway, the automobile tires could not gain enough traction to move the vehicle from its standing or parking position, and the vehicle becomes immobilized or stranded.

Traction in a general sense relates to the act of pulling a load over a surface by overcoming the resistance to motion. In a traffic situation traction relate to the friction or resistance to slipping developed at the point of contact of a driven wheel and the road surface on which it rolls. Under ordinary driving conditions the torque delivered to the automobile wheels by the axle, presses the wheels against the road surface long enough to develop sufficient traction required for moving the vehicle.

However, under snowy or icy conditions the surface of the road is slippery and the vehicle wheels may not gain sufficient traction because of the low coefficient of friction involved. An additional contributory factor to lack of traction under these circumstances is the heat given off by the friction of the tires which melts the snow or ice on the road surface, the former becoming solidified and glazed and making the surface even more slippery.

This presents special driving hazards and causes numerous accidents which take their toll in human life and property.

In order to safeguard against these hazards, drivers have been using for many years various forms of chains which were mounted on individual tires to increase traction. Also special snow tires have been designed with particular gripping treads in order to gain added traction. However, these devices proved to be inefficient, expensive, cumbersome and inconvenient and worst of all detrimental and damaging to the road surface.

In recent years there has been an increasing demand for relatively inexpensive and efficient devices that would provide additional traction to vehicles in hazardous weather conditions. Attempts were made to meet this demand by devices such as those illustrated in U.S. Pat. No. 3,836,075 or 3,858,803 and others.

However, it is recognized that these well known traction devices are inefficient and have serious disadvantages. For example, one of these devices (U.S. Pat. No. 3,836,075) has sharply pointed projections provided on the upper side of the devices for engaging the vehicle tires. This feature could prove highly detrimental to the tires through wear and tear of the same. Also the lower side of the device facing the ground is provided with a far smaller number of projections for gripping the road surface as compared with the number of projections used to engage the tires. It would appear that under slippery and icy conditions, this device would not work effectively to provide the added traction required for moving the vehicle.

A major disadvantage lies in another known device (U.S. Pat. No. 3,858,803) providing for transverse openings in a traction mat. When the road is covered with a layer of snow or ice, the latter could fill in the openings in the mat and form a solid slippery surface which would render the mat ineffective in providing any added traction to the stranded vehicle.

Thus, the present invention provides for a traction device that would substantially eliminate the above disadvantages and would resolve the long standing problems arising from lack of sufficient traction to motor vehicles in hazardous weather conditions.

SUMMARY OF THE INVENTION

The present invention contemplates an improved traction strip including a sheet integrally formed of flexible material and provided with a plurality of rectangularly shaped channels which are mounted in a contiguously spaced relationship on both sides thereof. The channels which are equal in size and have parallel side walls perpendicular to their bases, are mounted on the sheet in a back to back position such that upper channels' side walls register with respective lower channels' side walls and the free ends of the side walls of each channel are directed away from the sheet on both sides thereof. This arrangement allows the free ends of the upper channels to engage the vehicle tires, while respective free ends of the lower channels grip the surface of the road.

The sheet may be formed in any desirable shape and size in accordance to predetermined design, specifications and values. The sheet may be formed of any flexible material and preferably from rubber or plastic material.

The channels may be made of any suitable metal and preferably steel. The sheet is designed to overlap the channels on the front, back and sides thereof.

In accordance with the invention, the spacing between individual adjacent channels on each side of the sheet is preferably proportional to the height of the channels, and bears a certain relationship to the maximum bending or curving of the traction strip in response to the vehicle load. The relationship of the spacing between adjacent channels and the height of the channels is preferably such that the radius of curvature of the traction strip will never be smaller than the radius of curvature of the wheel of the vehicle.

Additional objects, features and advantages of the device of the invention will become apparent from the following detailed discussion and the accompanying drawings.

BRIEF DESCRIPTION OF THE DRAWINGS

In the accompanying drawings there is illustrated in detail a preferred embodiment of the invention, this being indicative, however, of one of various ways in which the principle of the invention may be employed.

In the drawings:

FIG. 1 is a perspective view of the traction strip of the present invention,

FIG. 2 is an elevation view of the traction strip,

FIG. 3 is a sectional view of the strip taken along line 3—3 of FIG. 2,

FIG. 4 is an elevation view of the traction strip of the invention, in use with an automotive driving wheel.

DETAILED DESCRIPTION

Referring to FIGS. 1 and 2, the traction strip comprises of a flat sheet 1, which may be of any size and shape. It is preferred that the sheet have a rectangular or longitudinal configuration and ranging in size, 4–6 inches in width and a minimum of approximately 18 inches in length. The sheet 1, may be made of any flexible material, preferably of natural or synthetic rubber or plastic material.

A group of rectangularly shaped channels 3 is fastened or secured to each side of sheet 1. Each channel 3 is formed of a base 5 and a pair of parallel side walls 4 that are perpendicular to base 5. Channels 3 which are all equal in size may be made of any suitable metal and preferably from steel which is least expensive, more durable and strong enough to support heavy loads. The channels may be mounted or fastened to sheet 1, by any known and suitable mounting or fastening means such as screws, bolts or rivets. It is preferred that channels 3 be fastened to sheet 1, by way of rivets 7. FIG. 1 of the drawings does not show the fastening means in place, but these are illustrated clearly in FIGS. 2 and 3. Each channel 3 is provided with at least a pair of holes or bores 6 at each end thereof, for receiving the rivets 7. Sheet 1 is also provided with holes or bores 2, the number of holes 2 corresponding to the number of the channels and the number of rivets per channel desired.

Channels 3 are preferably mounted on sheet 1, parallel to each other and in a contiguous spaced relationship on each side thereof. Nonparallel disposition of the channels is also contemplated by this invention. The channels 3 are mounted or fastened to sheet 1 on both sides thereof in a back to back manner, such that side walls 4 and holes 6 of channels 3 mounted on one side (which may be upper side) of sheet 1 register with respective side walls 4 and holes 6 of respective channels on the other side (which may be lower side) of sheet 1. Holes 2 of sheet 1 also register with respective holes 6 of channels 3. The first hole 2 shown on the left in FIG. 3 illustrates the condition prior to insertion of rivet 7. The free ends or edges of side walls 4 of each channels are directed away or outwardly of the sheet 1, on both sides thereof.

The width of each channel may range from 1–3 inches, preferably 2–3 inches, the length may range from 3–4 inches and the height of side walls 4 should preferably be not less than ⅜ inch. Sheet 1 is formed such that its peripheral edges overlap the channels 3 on the front, back and sides of the same.

Side walls 4 may be notched or serrated in order to provide better gripping action and as a result added and improved traction.

It is preferable as shown in FIG. 1 and 3 that only the leading edge of side wall 4 of the front most channel have serrations 8 rather than being straight or parallel for the purpose of providing greater traction, or gripping ability.

As shown in FIG. 2 and 4 the spacing Y between adjacent individual channels 3 is preferably proportional to the height of each channel X. The relationship between spacing Y and the height X (of each channel) bears a relationship and has a limiting effect on the optimum amount of bending of the traction strip in response to a load. It is important that the spacing Y be kept smaller than height X. Improved traction will result if the radius of curvature R of the traction strip will always be larger than that of the radius of curvature L of the driving wheel or tire engaging the strip.

It is obvious that the spacing between channels and the height of the channels are factors that will influence the degree of curvature or bending of the strip that is possible.

As shown in FIG. 4 the traction strip will never assume a radius of curvature R that is less than the radius of curvature L of the driving wheel engaging therewith.

If radius of curvature R of the traction strip becomes smaller than the radius of curvature L of the driving wheel or tire W, the side walls 4 of the lower channels 3 (channels on the side facing the road surface) would not project downwardly to the road surface, but would tend to slide over the road surface at an angle to the road surface, rather than dig into it, resulting in a "kicking out" of the strip from under the wheel.

Usually two traction strips are needed for each vehicle. Each traction strip is being placed under a driving wheel of the vehicle.

Both sides of the traction strip are interchangeable in the sense that either side could equally be used for either engaging the wheels or tires or for gripping the road surface. Usually the side of the traction strip engaging the wheel is called the upper side and its channels the upper channels, and the side gripping the road surface is called the lower side and its channels the lower channels.

In the preferred embodiment of the invention as shown in FIG. 4, the spacing between adjacent channels and the height of each channel should be strongly related to each other. The relationship should be such that, in response to a load (e.g., driving wheel), respective pairs of adjacent side walls of upper channels converge to form individual teeth-like edged joints that engage firmly the load (e.g., driving wheel). At the same time, respective pairs of adjacent side walls of lower channels diverge laterally effecting better gripping of the road surface.

It is important to keep the traction strip small in size so as to reduce costs, storage space and weight involved, in order to make the device easy to handle and set into position under a vehicle wheel.

What is claimed is:

1. A traction strip for driving wheels of motor vehicles comprising
    an integrally formed flat and flexible sheet having predetermined size and shape,
    a plurality of metal channels contiguously spaced and mounted on each side of said sheet, said channels being equal in size and having side walls substantially perpendicular to their base, and
    means for mounting said channels on said sheet,
    said channels being secured to said sheet in a back to back position such that the side walls of upper channels register with respective side walls of lower channels, the upwardly directed channels engaging a driving wheel and the downwardly directed channels gripping the road surface, and
    the predetermined values of the spacing between adjacent channels and the height of each channel being related to each other such as to exert a limiting effect on the maximum bending of the traction strip in response to the load.

2. A traction strip according to claim 1, wherein each of said channels has a rectangular configuration.

3. A traction strip according to claim 1, wherein said sheet overlaps said channels at the front, rear and side ends thereof.

4. A traction strip according to claim 1, wherein the leading edge of the frontmost channel has a serration for providing greater traction.

5. A traction strip according to claim 1 wherein the relationship between the predetermined values of the spacing between adjacent channels and the height of each channel, is such that the traction strip will never assume a radius of curvature that is less than that of the driving wheel engaging therewith.

6. A traction strip according to claim 1 wherein said channels are disposed in parallel relationship with respect to each other.

7. A traction strip according to claim 1, wherein the predetermined values of the spacing between adjacent channels and the height of each channel are related to each other such that, in response to a driving wheel load, respective pairs of adjacent side walls of upper channels converge to form individual edged-joints that firmly engage the driving wheel, while respective pairs of adjacent side walls of lower channels diverge laterally, so as to effect better gripping of the road surface.

* * * * *